(12) United States Patent
Powers et al.

(10) Patent No.: US 10,271,270 B2
(45) Date of Patent: Apr. 23, 2019

(54) REDUCING FRAUDULENT ACTIVITY ASSOCIATED WITH MOBILE NETWORKS

(71) Applicant: Global Business Software Development Technologies, Inc., Lubbock, TX (US)

(72) Inventors: Michael W. Powers, Lubbock, TX (US); Stephen P. Frisbie, Lubbock, TX (US)

(73) Assignee: Global Business Software Development Technologies, Inc., Lubbock, TX (US)

(*) Notice: Subject to any disclaimer, the term of this patent is extended or adjusted under 35 U.S.C. 154(b) by 47 days.

(21) Appl. No.: 15/216,475

(22) Filed: Jul. 21, 2016

(65) Prior Publication Data
US 2018/0027484 A1    Jan. 25, 2018

(51) Int. Cl.
| | |
|---|---|
| *H04M 1/66* | (2006.01) |
| *H04W 48/14* | (2009.01) |
| *H04W 4/02* | (2018.01) |
| *H04W 8/26* | (2009.01) |
| *H04W 40/02* | (2009.01) |
| *H04W 48/04* | (2009.01) |

(52) U.S. Cl.
CPC ............ *H04W 48/14* (2013.01); *H04W 4/02* (2013.01); *H04W 8/26* (2013.01); *H04W 40/02* (2013.01); *H04W 48/04* (2013.01)

(58) Field of Classification Search
CPC ....... H04W 4/02; H04W 64/00; H04W 12/02; H04W 12/06; H04W 12/08; H04W 12/12; H04W 88/02

USPC ..... 455/456.1, 456.2, 456.5, 410, 411, 435.1
See application file for complete search history.

(56) References Cited

U.S. PATENT DOCUMENTS

| | | | |
|---|---|---|---|
| 2003/0009593 A1 | 1/2003 | Apte | |
| 2006/0205434 A1 | 9/2006 | Tom et al. | |
| 2008/0076392 A1* | 3/2008 | Khetawat | H04L 63/123 |
| | | | 455/411 |
| 2008/0293409 A1 | 11/2008 | Gillot et al. | |
| 2008/0305792 A1* | 12/2008 | Khetawat | H04W 88/12 |
| | | | 455/435.1 |

(Continued)

FOREIGN PATENT DOCUMENTS

| | | |
|---|---|---|
| EP | 2 209 331 A1 | 7/2010 |
| KR | 100902486 B1 | 6/2009 |
| WO | 2008/092998 A1 | 8/2008 |

OTHER PUBLICATIONS

U.S. Appl. No. 15/251,558, filed Aug. 30, 2016, Powers et al.

(Continued)

*Primary Examiner* — Temica M Beamer
(74) *Attorney, Agent, or Firm* — Baker Botts L.L.P.

(57) ABSTRACT

In one embodiment, a network interface operable to receive, from a requesting user, a request for routing information of a requested device. A processor determines location information associated with the requested device, and generates a temporary networked device identifier associated with a networked device identifier of the requested device and temporary location information associated with the location information. The network interface then communicates the temporary networked device identifier and temporary location information to the requesting user.

20 Claims, 6 Drawing Sheets

(56) References Cited

U.S. PATENT DOCUMENTS

2017/0187691 A1\* 6/2017 Lee ........................ H04W 4/70

OTHER PUBLICATIONS

U.S. Appl. No. 15/216,452, filed Jul. 21, 2016, Powers et al.
PCT Notification of Transmittal of The International Search Report and the Written Opinion of The International Searching Authority, or the Declaration, International Application No. PCT/US2017/042699, 5 pages, dated Oct. 25, 2017.
PCT Written Opinion of The International Searching Authority, International Application No. PCT/US2017/042699, 5 pages, dated Oct. 25, 2017.

\* cited by examiner

REDUCING FRAUDULENT ACTIVITY ASSOCIATED WITH MOBILE NETWORKS

TECHNICAL FIELD

This invention relates in general to mobile networks, and more particularly to reducing fraudulent activity associated with mobile networks.

BACKGROUND

Mobile communication devices have become ubiquitous in modern day society. Countless individuals communicate with one another using mobile communication devices over a wireless network. Moreover, individuals may communicate domestically or internationally, or may even communicate over their networked devices when travelling abroad. The increased complexity and availability of the mobile communication network has led to an increased susceptibility of fraudulent activity. Fraudulent activity is an enormous threat to the telecommunication industry, especially because network operators across the world tend to earn a significant portion of revenue from roaming subscribers.

As an example, fraudsters may perpetrate international revenue sharing fraud. An example of international revenue sharing fraud includes using Subscriber Identity Mobile ("SIM") boxes to terminate international calls that are routed to local phone numbers in the respective country, thereby bypassing all international interconnect charges. The SIM box is a type of hardware usually equipped with multiple SIM cards. The SIM boxes will use multiple SIM cards and are typically programmed to fraudulently route international calls and connect the call as local traffic. The fraudster may then collect the international interconnect charges.

As an additional example, fraudsters may infiltrate signaling protocols to repurpose information that is available on such signaling protocols. Signaling protocols, such as the Signaling System 7 ("SS7") protocol, allow various service providers to route communication and services amongst each other, even if the service providers are located in separate countries. These protocols, however, may be vulnerable to security breaches, wherein a fraudster may glean valuable information from the signaling protocol. For example, hackers may be able to locate users anywhere in the world, listen to a user's call, record a user's text, and defraud both the user and the service provider.

SUMMARY OF PARTICULAR EMBODIMENTS

According to embodiments of the present disclosure, disadvantages and problems associated with fraudulent activity related to mobile networks may be reduced or eliminated.

In accordance with a particular embodiment of the present disclosure, a network interface receives a communication request over a communication link of a radio access network. A processor then determines one or more characteristics associated with the communication request and applies one or more policy rules to the one or more determined characteristics associated with the communication request. The processor terminates the communication request based in part on the application of the one or more policy rules to the one or more determined characteristics.

In accordance with another aspect of the present disclosure, a network interface operable to receive, from a requesting user, a request for routing information of a requested device. A processor determines location information associated with the requested device, and generates a temporary networked device identifier associated with a networked device identifier of the requested device and temporary location information associated with the location information. The network interface then communicates the temporary networked device identifier and temporary location information to the requesting user.

Certain embodiments of the present disclosure may provide one or more technical advantages. A technical advantage of one embodiment includes decreasing network congestion and enabling higher throughput from networked devices by alleviating fraudulent communications or requests and decreasing the processing demand on elements of a cellular network. As another example, a technical advantage of one embodiment includes improving the communication quality of networked devices in a servicing area, improving the security of cellular networks and signaling protocols, and improving the processing power of a cellular network.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DESCRIPTION OF EXAMPLE EMBODIMENTS

Embodiments of the present invention and its advantages are best understood by referring to FIGS. 1-7, like numerals being used for like and corresponding parts of the various drawings.

Networked devices have become ubiquitous in modern day society. Countless individuals communicate with one another using networked devices over a wireless network. Moreover, individuals may communicate domestically or internationally, or may even communicate over their networked devices when travelling abroad. The increased complexity and availability of the mobile communication network has led to an increased susceptibility of fraudulent activity. Fraudulent activity is an enormous threat to the telecommunication industry, especially because network operators across the world tend to earn a significant portion of revenue from roaming subscribers.

The teachings of this disclosure recognize that it would be desirable to provide a system that applies one or more policy rules to one or more characteristics associated with a communication request. This system would reduce or eliminate the technical problems associated with fraudsters using SIM boxes to terminate international calls that are routed to local phone numbers in their respective countries. Moreover, this system would reduce or eliminate the technical problems associated with SIM boxes degrading the local service where the SIM boxes operate.

Moreover, the teachings of this disclosure recognize that it would be desirable to provide a system that, when receiving a location request from a requesting user, creates a temporary networked device identifier and temporary location information that is associated with the requested device and location information associated with the requested device. The teachings of this disclosure would further recognize that it would be desirable to communicate the temporary networked device identifier and temporary location to the requesting user. This system would reduce or eliminate technical problems associated with fraudsters infiltrating signaling protocols to repurpose information that is available on those protocols. As an example, a potential fraudster would receive a temporary networked device identifier and temporary location information for a user. The potential fraudster would not be able to use this temporary information to perpetrate fraudulent activity associated with the user.

Figure 1:
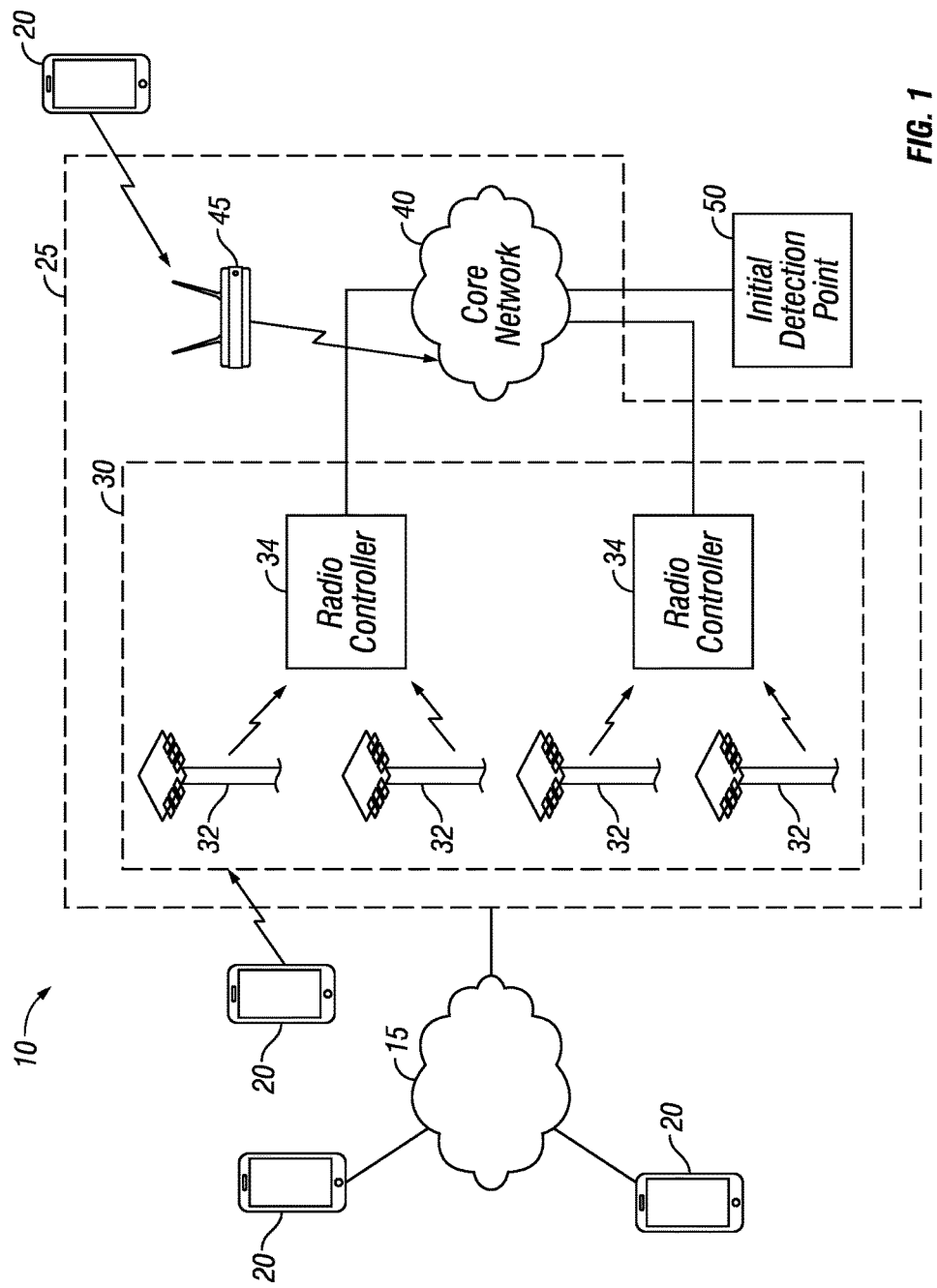
FIG. 1 illustrates a mobile communication system in which an initial detection point has been installed.

FIG. 1 illustrates mobile communication system 10 in which initial detection point 50 has been installed. Mobile communication system 10 provides mobile communication service to networked devices 20 operating within a geographic area associated with mobile communication system 10. Mobile communication system 10 includes networked device 20; networked device 20 may include an access network 30, and core network 40. Mobile communication system 10 may support communication of any suitable type and/or in accordance with any appropriate communication standards including, but not limited to, any second generation ("2G"), third generation ("3G"), or fourth generation ("4G") standards, fifth generation ("5G") standards, or any suitable transitional generation standards (e.g., 2.5G, 2.75G, 3.5G, and 3.9G). Particular embodiments of mobile communication system 10 may support communications in accordance with, for example, Global System for Mobile Communications (GSM), CDMAOne, General Packet Radio Service (GPRS), Enhanced Data rates for GSM Evolution (EDGE), CDMA2000, Integrated Digital Enhanced Network (iDen), Universal Mobile Telecommunications System (UMTS), Wideband Code Division Multiple Access (WCDMA), Long Term Evolution (LTE), Long Term Evolution Advanced (LTE-Advanced), and/or Worldwide Interoperability for Microwave Access (WiMAX) communication standards.

Network 15 facilitates communications between components in mobile communication system 10, such as networked devices 20 and mobile network 25. This disclosure contemplates any suitable network 15 operable to facilitate communication between the components of system 10. Network 15 may include any interconnecting system capable of transmitting audio, video, signals, data, messages, or any combination of the preceding. Network 15 may include all or a portion of a public switched telephone network ("PSTN"), a public or private data network, a local area network ("LAN"), a metropolitan area network ("MAN"), a wide area network ("WAN"), a local, regional, or global communication or computer network, such as the Internet, a wireline or wireless network, an enterprise intranet, or any other suitable communication link, including combinations thereof, operable to facilitate communication between the components. This disclosure contemplates end networks having one or more of the described properties of network 15.

Networked device 20 is a mobile communication device being used by a caller through mobile communication system 10. Networked device 20 is any type of networked device, including but not limited to networked device 20, mobile network 25, access network 30 (including base stations 32 and radio controllers 34), or core network 40. A networked device may be implemented using any suitable type of processing system and may include any suitable combination of hardware, firmware, and software. In certain embodiments, networked device 20 may comprise a mobile device, access network 30 (including base stations 32 and radio controllers 34), and/or core network 40. In certain embodiments, networked device 20 may be networked device 20. Networked device 20 may include one or more networked devices at one or more locations. Each networked device 20 may include any appropriate number of input devices, output devices, mass storage media, processors, memory, or other suitable components for receiving, processing, storing, and communicating data. For example, each networked device 20 may include a personal computer, workstation, network computer, kiosk, wireless data port, personal digital assistants ("PDAs"), one or more Internet Protocol (IP) telephones, smart phones, table computers, one or more servers, a server pool, one or more processors within these or other devices, or any other suitable processing device capable of receiving, processing, storing, and/or communicating information with other components of mobile communication system 10. Networked device 20 may be a stand-alone computer or may be a part of a larger network of computers associated with an entity. Networked device 20 may also be a SIM box, an analog telephone adaptor ("ATA"), or a Private Branch eXchange ("PBX"). Moreover, multiple networked devices 20 may exist in a SIM box.

Networked device 20 may communicate in mobile communication system 10 over a communication link on the radio access network. In certain embodiments, networked device 20 communicates to mobile network 25 via network 15. Networked device 20 may communicate directly to core network 40, through access point 45, and, in particular embodiments, networked device 20 may comprise mobile network 25.

Networked device 20 may be associated with a subscriber identifier and a hardware identifier. The subscriber identifier identifies the user and/or SIM of networked device 20. For example, a subscriber identifier may comprise a mobile identifier number ("MIN"), mobile subscriber identification number ("MSIN"), integrated circuit card ID ("ICC-ED"), international mobile subscriber identifier ("IMSI"), or mobile subscriber international ISDN number ("MSISDN"). Similarly, a hardware identifier identifies the hardware of networked device 20. For example, a hardware identifier may comprise an International Mobile Station Equipment Identity ("IMEI"), electronic serial number ("ESN"), or a mobile equipment identifier ("MEID").

Mobile network 25 is any type of network or networked device that is able to communicate with networked device 20, access network 30 (including base stations 32 and radio controllers 34), or core network 40. Mobile network 25 may be implemented using any suitable type of processing system and may include any suitable combination of hardware, firmware, and software. In certain embodiments, mobile network 25 may comprise networked device 20, access network 30 (including base stations 32 and radio controllers 34), and/or core network 40. In certain embodiments, mobile network 25 may be networked device 20. In the illustrated embodiment, mobile network 25 includes access network 30, core network 40, and access point 45. Mobile network 25 may include one or more mobile networks at one or more locations. Mobile network 25 may represent or include a radio access network and/or any elements responsible for providing a radio or air interface to networked device 20 and/or other elements of mobile communication system 10.

Access network 30 communicates wirelessly with networked devices 20 and serves as an interface between networked devices 20 and core network 40. Access network 30 may represent or include a radio access network and/or any elements responsible for providing a radio or air interface for core network 40. For example, in the illustrated embodiment, access network 30 includes base stations 32 and radio controllers 34. Access network 30 may also comprise mobility services edge ("MSE") routers. Networked device 20 may communicate to access network 30 over a communication link on the radio access network. In certain embodiments, access network 30 may support Integrated Services Digital Network ("ISDN") access signaling.

Base stations 32 communicate wirelessly with networked devices 20 to facilitate mobile communication for networked devices 20. Base stations 32 may include any appropriate elements to communicate with networked devices 20 and to interface networked devices 20 with core network 40. For example, depending on the communications standards supported by access network 30 and core network 40, each base station 32 may represent or include a conventional base station, a Node B, an evolved Node B (eNode B), a radio base station (RBS), or any other suitable element capable of communicating with networked devices 20 wirelessly.

Radio controllers 34 control the operation of base stations 32 and interact with appropriate elements of core network 40. Radio controllers may include any appropriate elements to manage the operation of base stations 32. In particular embodiments, radio controllers 34 may be responsible for managing radio channels used by base stations 32, managing handoffs between base stations 32, concentrating communication channels transmitted by base stations 32, and/or otherwise managing the operation and interoperation of base stations 32 and interfacing base stations 32 with core network 40. For example, depending on the communications standards supported by access network 30 and core network 40, radio controllers 34 may each represent or include a base station controller (BSC), a radio network controller (RNC), or any other suitable collection of hardware and/or software appropriate for controlling base stations 32.

Core network 40 routes voice and/or data communicated by networked devices 20 from access network 30 to other networked devices 20 or to other communication devices coupled to core network 40 through landline connections or through other networks. In particular embodiments, core network 40 may include a backbone network and any backhaul elements connecting access network 30 to the backbone network. Core network 40 may support any appropriate standards or techniques for routing such communications. For example, in embodiments of mobile communication system 10 that support GSM or UMTS, core network 40 may represent a Mobile Application Part (MAP) core network, while in embodiments of mobile communication system 10 that support CDMA2000, core network 40 may represent an IS-41 core network. Additionally, core network 40 may also be responsible for aggregating communication for longhaul transmission, authenticating users, managing user mobility, providing call control, billing, or other functionality associated with providing communication services to networked devices 20. In particular embodiments, core network 40 may include separate subnetworks for circuit-switched and packet-switched communication. For example, in embodiments that support GSM communication, core network 40 may include a network switching subsystem and any mobile switching centers (MSCs) for providing circuit-switched services, as well as a GPRS core network and any Gateway GPRS Support Nodes (GGSNs) and Serving GPRS Support Nodes (SGSNs) for providing packet-switched services. In general, core network 40 may include any components suitable for routing and supporting voice and/or data communications for networked devices 20.

In certain embodiments, core network 40 may support Customized Applications for Mobile Networks Enhanced Logic ("CAMEL") protocol. The CAMEL protocol is a set of standards designed to work on either a GSM or UMTS network. When a CAMEL-enabled subscriber registers with core network 40, core network 40 transfers CAMEL subscription information ("CSI") to networked devices that need the information to provide CAMEL service to the subscriber. Network traffic through the CAMEL protocol may be referred to as on-network traffic.

Moreover, core network 40 may also support the ISDN User Part ("ISUP") protocol. The ISUP protocol defines a set of procedures and messages. The ISUP protocol may provide core network signaling and may be compatible with both ISDN and non-ISDN traffic. Network traffic through the ISUP protocol may be referred to as off-network traffic.

Access point 45 is a component that facilitates communications between networked device 20 and core network 40. While illustrated as facilitating communication between networked device 20 and core network 40, access point 45 may facilitate communication between network 15, networked devices 20, networked device 20, access network 30, core network 40, and/or any other component of mobile communication system 10. Access point 45 is any type of networking device that allows one networked device to communicate with another networked device. Mobile communication system 10 may comprise one or more access points 45. Access point 45 may include any interconnecting system capable of transmitting audio, video, signals, data, messages, or any combination of the preceding. Access point 45 may include all or a portion of a PSTN, a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the components. This disclosure contemplates end networks having one or more of the described properties of access point 45.

Initial detection point 50 represents any suitable component that facilitates: (1) applying one or more policy rules to one or more characteristics associated with a communication request, and/or (2) when receiving a location request from a requesting user, creating a temporary networked device identifier and temporary location information that is associated with the requested device and location information associated with the requested device and communicating the temporary networked device identifier and temporary location to the requesting user. Initial detection point 50 may be connected to core network 40. Initial detection point 50 may include a network server, any suitable remote server, a mainframe, a host computer, a workstation, a web server, a personal computer, a file server, or any other suitable device operable to communicate with computers 24. In some embodiments, initial detection point 50 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems. The functions of initial detection point 50 may be performed by any suitable combination of one or more servers or other components at one or more locations. In the embodiment where the components are servers, the servers may be public or private servers, and each server may be a virtual or physical server. The server may include one or more servers at the same or at remote locations. Also, initial detection point 50 may include any suitable component that functions as a server.

In an exemplary embodiment of operation, access network 30, core network 40, and/or initial detection point 50 may receive a request to provide routing information for requested networked device 20 from a requesting user. Typically, initial detection point 50 receives a request for routing information from a requesting user that is an international user. Generally, an international user is located in a separate geographical area than the geographical area of the requested networked device 20. Routing information for networked device 20 may comprise a location information for networked device 20 (e.g., an identifier for base station 32 that is communicating with to networked device 20, coordinates of networked device 20), networked device 20 identifier (e.g., IMEI, phone number, or any other unique identifier of networked device 20), or any other information associated with networked device 20 such that communications to networked device 20 may be redirected (e.g., through a redirect request) or a request for the location of networked device 20 may be made (e.g., though a location request).

When receiving a request for routing information, initial detection point 50 determines the routing information associated with the requested networked device 20. In certain embodiments, routing information comprises the location information and networked device identifier. Initial detection point 50 may then create a temporary location information and a temporary networked device identifier, and associate the temporary location information and the temporary networked device identifier with the location information and networked device identifier of the requested networked device 20. In certain embodiments, initial detection point 50 may store the association of the temporary location information and the temporary networked device identifier with the location information and networked device identifier in a database. In addition, initial detection point 50 may create a temporary location information and a temporary networked device identifier only when the requesting user is an international user.

Initial detection point 50 may create the temporary location information and temporary networked device identifier in a myriad of ways. In one embodiment, initial detection point 50 creates the temporary location information and temporary networked device identifier using random number generators, such as pseudorandom number generators, middle square method, Mersenne Twister algorithm, a masking algorithm, or any algorithm that masks the original location information and networked device identifier. Initial detection point 50 may also respond to the request for routing information with the created temporary location information and temporary networked device identifier. Generally, initial detection point 50 will use a random number generator to create a temporary location information and a temporary networked device identifier that is in the same format as the original location information and networked device identifier.

In certain embodiments, the requesting user may then attempt to route a communication using its received routing information containing the temporary location information and temporary networked device identifier. Access network 30 (e.g., the MSE or any network component of mobile communication system 10 that receives a request) may then request initial detection point 50 to convert the temporary location information and temporary networked device identifier in the routing information to the actual location information and networked device identifier. In certain embodiments, initial detection point 50 accesses the database to identify the associated location information and networked device identifier using the temporary location information and temporary networked device identifier. For example, initial detection point 50 queries the database using the temporary location information and temporary networked device identifier to ascertain the original location information and actual networked device identifier. Initial detection point 50 then communicates the location information and networked device identifier to access network 30. Access network 30 then uses the location information and networked device identifier to properly route the communication to its intended recipient.

Moreover, in additional embodiments, a second requesting user may attempt to provide routing information for requested networked device 20. Initial detection point 50 may then generate a second temporary networked device identifier and second temporary location information for requested networked device 20. In particular embodiments, the second temporary networked device identifier is different in value than the previous temporary networked device identifier. Similarly, the second temporary location information is different in value than the previous temporary location information. Similar to generating the previous temporary networked device identifier and temporary location information, initial detection point 50 may generate the second temporary networked device identifier and second temporary location information using a masking algorithm. Initial detection point 50 then associates the second temporary networked device identifier and second temporary location information with networked device 20 and its associated location. Initial detection point 50 may also communicate the second temporary networked device identifier and second temporary location information to the second requesting user.

Moreover, for additional security, initial detection point 50 may encrypt communication (such as the communication of the temporary networked device identifier and the temporary location information) to the requesting user. Similarly, a user may encrypt communication to networked device 50, access network 40, core network 50, and/or initial detection point 50. The encryption is used to protect the communication in transit from a device in mobile communication system 10 to another device in mobile communication system 10. Example encryption methods include Diffie-Hellman key exchange, Rivest-Shamir-Adleman ("RSA") algorithms, or protocols such as Secure Shell ("SSH"), Secure/Multipuporse Internet Mail Extensions ("S/MIME"), Advanced Encryption Standard ("AES"), Secure Sockets Layer ("SSL"), and Transport Security Layer ("TSL"). Initial detection point 50, requesting user, or any number of elements in mobile communication system 10 may contain the decryption key to decrypt the encrypted communication.

In an additional exemplary embodiment of operation, initial detection point 50 may implement policy rules to determine a variety of actions (e.g., terminate, connect, hold) to apply to a communication request. The variety of actions and/or the determination of the variety of actions to apply may occur in real-time or near real-time to when a communication request is communicated from networked device 50. A communication request comprises a request to communicate with one or more networked devices 20. A communication request may precede the communication, may be a header to the communication, may be the communication itself, or any other type of message to indicate that a request for communication has been made. In certain embodiments, access network 30 communicates a request to initial detection point 50 to authorize the communication. In alternate embodiments, initial detection point 50 automatically receives the information to determine whether to authorize the communication. For example, access network 30 may route the communication to initial detection point 50.

The communication request may occur in real-time with the communication. In certain embodiments, the communication and/or communication request is communicated using the CAMEL protocol and/or the ISUP protocol. Moreover, the communication and/or communication request may be sent in on-network traffic and/or off-network traffic. Initial detection point 50 may implement its policy rules to determine the action to take on the communication request and/or communication before the communication takes place or while the communication is taking place. For example, the policy rule may instruct initial detection point 50 to hold the communication until an additional authorization is provided. In an exemplary embodiment, the communication is routed alongside the communication request to the initial detection point 50, and then the initial detection point may route the communication to its next routing point after determining whether to authorize the communication.

Initial detection point 50 may then determine characteristics associated with the communication request. In certain embodiments, initial detection point 50 associates characteristics associated with the communication request to the subscriber identifier associated with the communication request. Initial detection point 50 may also associate characteristics associated with the communication request to the hardware identifier, or may associate the characteristics to both the subscriber identifier and hardware identifier. Initial detection point 50 may determine characteristics in a myriad of ways. Certain characteristics, such as the subscriber identifier, hardware identifier, and destination of the communication, may be determined from the communication and/or communication request. In addition, initial detection point 50 may look at past call detail records ("CDRs") to determine previous data records associated with the subscriber identifier and/or hardware identifier to identify characteristics associated with the communication request. For example, CDR may contain information of the party originating the communication, the party receiving the communication, the starting time of the call, the end time of the call, the call duration, the cost of the communication, the billing phone number that is charged for the call, an identification of additional digits entered after the call was connected, whether the call was successfully connected, call type (e.g., SMS, VoIP, or voice), fault conditions encountered on the call, the routing of the call (e.g., Switch ID or Visitor Location Register ("VLR")), data communicated on call, or any other type of information or characteristics related to a communication. In certain embodiments, initial detection point 50 may associate only a predefined number of past communications to the subscriber identifier and/or hardware identifier. Initial detection point may also analyze characteristics associated with elements in mobile network 25 in mobile communication systems 10. For example, initial detection point may determine the utilization and/or load of a networked device 20 in mobile communication system 10.

Initial detection point 50 may determine whether the characteristics meet any of the policy rules. The policy rules are rules that determine what type of action initial detection point 50 should take towards a communication request. Initial detection point 50 may apply policy rules to the one or more characteristics associated with the communication request to determine the type of action to apply to the communication request. Policy rules consist of any type of rules, logic, algorithms, code, and instructions to determine what type of action initial detection point 50 should apply to the communication request. For example, policy rules may indicate that a communication request should be terminated if the subscriber has placed a number of consecutive short duration calls to premium-rate telephone numbers, a maximum amount of termination fees accrued by a subscriber has been reached, the count of hardware identifiers associated with the subscriber identifier exceeds a subscriber identifier threshold, the count of hardware identifiers associated with the subscriber identifiers exceeds a hardware identifier threshold, or any other logic, algorithm, policy, or rules that allows initial detection point 50 to determine the type of action to take for a communication request.

The policy rules may be created and inputted by an authorized user or may be determined by initial detection point 50 after performing statistical analysis For example, initial detection point 50 may determine that a networked device in mobile network 25 becomes overloaded during a certain period of the day. Initial detection point 50 may change the strictness of the policy rules during those periods of the day. As another example, initial detection point 50 may determine one or more policy rules to apply from a set of policy rules based in part on the one or more characteristics associated with the communication request. For example, if the communication request occurs during a weekend, initial detection point 50 may select a certain subset of policy rules from the set of policy rules to apply to the communication request. As another example, if the communication request is associated with a flagged subscriber identifier or flagged hardware identifier, initial detection point 50 may apply a certain subset of policy rules from the set of policy rules.

Based on the application of the policy rules to the one or more determined characteristics, initial detection point 50 may perform an action on the communication request. For example, the application of the policy rules may indicate that initial detection point 50 terminate the communication request. As another example, the application of the policy rules may indicate that initial detection point 50 complete the communication request or hold the communication request. In certain embodiments, initial detection point 50 may comprise a default action, such as completing the request, if one or more policy rules do not apply.

In certain embodiments, initial detection point 50 is also able to determine if one or more of the determined characteristics is included on an exemption list. The exemption list may contain a list of one or more determined characteristics (e.g., subscriber identifier, hardware identifier, destination call number, and originating call time). The exemption list may be predefined by an administrator or automatically determined by initial detection point 50. For example, initial detection point 50 may place networked device 20 on the exemption list based on the type of networked device 20 (e.g., a tablet is automatically included in the exemption list), a location associated with networked device 20, or any other information such that initial detection point 50 may make the determination on whether to place networked device 20 on the exemption list.

As an example embodiment of operation of implementing policy rules, initial detection point 50 may terminate a communication request when the subscriber exceeds a subscriber identification threshold. Initially, access network 30 may receive a communication request from networked device 20. The communication request comprises information such that initial detection point 50 may determine a subscriber identifier and a hardware identifier associated with networked device 20. A communication request is a request to authorize communication from networked device 20 to its intended recipient. A communication request may be communicated during initialization of a communication, as part of the communication, or in any other form of communication that identifies a subscriber identifier and a hardware identifier associated with networked device 20. Initial detection point 50 may then determine whether the hardware identifier has previously been associated with the subscriber identifier. If the hardware identifier has previously been associated with the subscriber identifier, initial detection point 50 may communicate a command to access network 30 or core network 40 to complete the communication request. Alternatively, initial detection point 50 may complete the communication request from networked device 20.

If the hardware identifier has not been previously associated with the subscriber identifier, initial detection point 50 may add the hardware identifier to a list of hardware identifiers associated with the subscriber identifier. Initial detection point 50 may also receive a list of hardware identifiers that are associated with the subscriber identifier, a count of hardware identifiers associated with the subscriber identifier, or any other information such that initial detection point 50 receives information associated with the hardware identifiers associated with the subscriber identifier.

Initial detection point 50 then determines if the count of hardware identifiers associated with the subscriber identifier exceeds a hardware identifier threshold. The hardware identifier threshold may be a set limit of hardware identifiers that may be associated with a subscriber identifier. In alternate embodiments, the hardware identifier may be an adaptive limit of hardware identifiers that may be associated with a subscriber identifier. For example, the threshold may adapt to time passed since a new hardware identifier has associated with the subscriber identifier or other characteristics associated with the user (e.g., number of calls, data usage, time of day, etc.). As another example, the threshold may adapt to different networked devices 20 or different users.

If initial detection point 50 determines that the count of hardware identifiers associated with a subscriber identifier exceeds a certain threshold, initial detection point 50 may terminate the communication or issue a command to terminate the communication. Terminating the communication may comprise blocking the communication, ignoring the communication, or any other means such that the communication is not completed. Moreover, in certain embodiments, initial detection point 50 may only terminate the communication after determining that the communication request is an international communication request. An international communication request is a request to communicate between two devices located in different countries. Typically, an international communication request is received from an international gateway.

If initial detection point 50 determines that the count of hardware identifiers associated with a subscriber identifier does not exceed a certain threshold, initial detection point 50 may complete the communication request or issue a command to access network 30 or core network 40 to complete the communication request. In certain embodiments, initial detection point 50 terminates the communication or issues a command to terminate the communication.

Similar to associating the hardware identifier to the subscriber identifier, initial detection point 50 may associate the subscriber identifier to the hardware identifier. If the subscriber identifier has previously been associated with the hardware identifier, initial detection point 50 may communicate a command to access network 30 or core network 40 to complete the communication request. Alternatively, initial detection point 50 may complete the communication request from networked device 20.

If the subscriber identifier has not been previously associated with the hardware identifier, initial detection point 50 may add the subscriber identifier to a list of subscriber identifiers associated with the hardware identifier. Initial detection point 50 may also receive a list of subscriber identifiers that are associated with the hardware identifier, a count of subscriber identifiers associated with the hardware identifier, or any other information such that initial detection point 50 receives information associated with the subscriber identifiers associated with the hardware identifier.

Initial detection point 50 then determines if the count of subscriber identifiers associated with the hardware identifier exceeds a subscriber identifier threshold. The subscriber identifier threshold may be a set limit of subscriber identifiers that may be associated with a hardware identifier. In alternate embodiments, the subscriber identifier threshold may be an adaptive limit of subscriber identifiers that may be associated with a hardware identifier. For example, the threshold may adapt to time passed since a new subscriber identifier has associated with the hardware identifier or other characteristics associated with the user (e.g., number of calls, data usage, time of day, etc.). As another example, the threshold may adapt to different networked devices 20 or different users.

If initial detection point 50 determines that the count of subscriber identifiers associated with a hardware identifier exceeds a certain threshold, initial detection point 50 may terminate the communication or issue a command to terminate the communication.

In particular embodiments, initial detection point 50 also determines if the subscriber identifier, hardware identifier, or both are included on an exemption list. The exemption list may contain a list of subscriber identifiers and hardware identifiers that are excluded from complying with the hardware identifier threshold. For example, a service provider may have a tester SIM card that is inserted into multiple mobile phone equipment for testing purposes, and, therefore, should not be subject to the hardware identifier threshold. If the subscriber identifier or hardware identifier is included in the exemption list, initial detection point 50 may complete the communication request for networked device 20. The exemption list may be predefined by an administrator or automatically determined by initial detection point 50. For example, initial detection point 50 may place networked device 20 on the exemption list based on the type of networked device 20 (e.g., a tablet is automatically included in the exemption list), a location associated with networked device 20, or any other information such that initial detection point 50 may make the determination on whether to place networked device 20 on the exemption list.

Modifications, additions, or omissions may be made to mobile communication system 10 without departing from the scope of the invention. For example, mobile communication system 10 may include any number of networked devices 20, access networks 30 (including base stations 32 and radio controllers 34), core network 40, and initial detection points 50. Furthermore, the components of mobile communication system 10 may be integrated or separated. For example, access network 30, core network 40, and initial detection point 50 may be incorporated into a single component.

Figure 2:
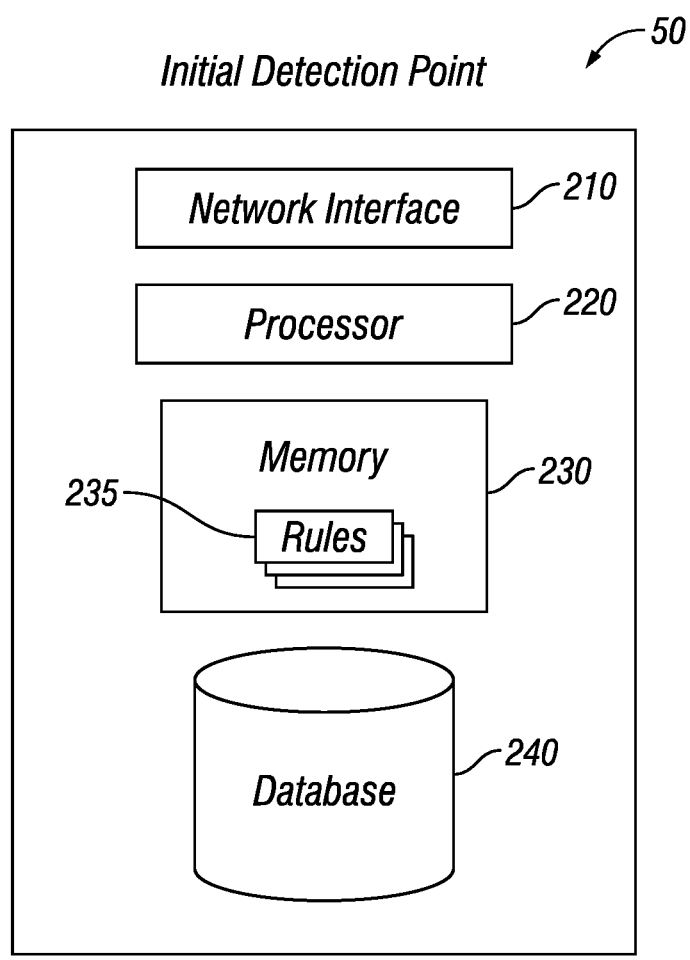
FIG. 2 is a block diagram showing in greater detail the contents of the initial detection point according to particular embodiments.

FIG. 2 is a block diagram showing in greater detail the contents of initial detection point 50 according to particular embodiments. As shown, initial detection point 50 includes network interface 210, processor 220, memory 230, and database 240.

Network interface 210 facilitates communication between processor 220, core network 40, or other components of initial detection point 50 or mobile communication system 10 over a data network. Network interface 210 may facilitate communication over portions of core network 40 or over a separate data network. In particular embodiments, network interface 210 includes or represents one or more network interface cards (NICs).

Processor 220 may represent or include any form of processing components, including dedicated microprocessors, general-purpose computers, or other devices capable of processing electronic information. Examples of processor 220 include field-programmable gate arrays (FPGAs), programmable microprocessors, digital signal processors (DSPs), application-specific integrated circuits (ASICs), and any other suitable specific- or general-purpose processors. Although FIG. 2 illustrates, for the sake of simplicity, an embodiment of initial detection point 50 that includes a single processor 220, initial detection point 50 may include any number of processors 220 configured to interoperate in any appropriate manner. For example, in particular embodiments, initial detection point 50 may include three field programmable gate arrays configured to: (1) applying one or more policy rules to one or more characteristics associated with a communication request, and/or (2) when receiving a location request from a requesting user, create a temporary networked device identifier and temporary location information that is associated with the requested device and location information associated with the requested device and communicate the temporary networked device identifier and temporary location to the requesting user.

Memory 230 stores processor instructions, filter parameters, routing information, and/or any other data utilized by initial detection point 50 during operation. Memory 230 may comprise any collection and arrangement of volatile or non-volatile, local or remote devices suitable for storing data, such as random access memory (RAM), read only memory (ROM), magnetic storage, optical storage, or any other suitable type of data storage components. Although shown as a single element in FIG. 2, memory 230 may include one or more physical components local to or remote from initial detection point 50. Memory 230 may include rules 235.

Rules 235 may include logic, rules, algorithms, code, tables, and/or other suitable instructions embodied in a computer-readable storage medium. Rules 235 may comprise a set of policy rules. Processor 220 may access rules 235 in applying policy rules to determine the action to apply to a communication request as described with respect to FIG. 1. For example, rules 235 may contain a policy rule such that a communication request associated with a subscriber identifier that previously communicated ten consecutive short duration calls should be terminated. Rules 235 may apply across some, all, or none of the initial detection point 50.

Database 240 represents a database that stores, either permanently or temporarily, associations between a temporary location information and temporary networked device identifier with location information and a requested device and/or associations between one or more hardware identifiers with a subscriber identifier. Database 240 includes any one or a combination of volatile or non-volatile local or remote devices suitable for storing information. For example, database 240 may include random access memory (RAM), read only memory (ROM), magnetic storage devices, optical storage devices, or any other suitable information storage device or a combination of these devices. Database 240 may include any suitable information for use in the operation of initial detection point 50. Additionally, database 240 may be included within initial detection point 50, rather than being a component external to initial detection point 50. Database 240 may be located in initial detection point 50, core network 40, access network 30, mobile communication system 10, or any other location suitable for database 240 to communicate with initial detection point 50. In certain embodiments, database 240 can be located in memory 230.

In particular embodiments, the structural components of initial detection point 50 may be attached to one or more chassis for mounting in a standard nineteen-inch ("19") or twenty-three-inch ("23") electronic rack. As a result, initial detection point 50 may represent a rack-mountable component that may be inserted into standard equipment racks commonly used to house telecommunications equipment in modern mobile communication systems, such as racks complying with EIA-310-D and/or EN 300 119. Thus, particular embodiments of initial detection point 50 may be easily integrated with existing equipment in many types of mobile communication systems. Furthermore, in particular embodiments, the components used to provide the functionality described for initial detection point 50 may be fit on a single chassis or a collection of chasses.

A component of initial detection point 50 may include an interface, logic, memory, and other suitable elements. An interface receives input, sends output processes the input and/or output, and performs other suitable operations. An interface may comprise hardware and software. Logic performs the operation of the component. For example, logic executes instructions to generate output from input. Logic may include hardware, software and other logic. Logic may be encoded in one or more non-transitory, tangible media, such as a computer readable medium or any other suitable tangible medium, and may perform operations when executed by a computer. Certain logic, such as a processor, may manage the operation of a component. Examples of a processor include one or more computers, one or more microprocessors, one or more applications, and other logic.

Modifications, additions, or omissions may be made to initial detection point 50 without departing from the scope of the invention. For example, initial detection point 50 may include any number of network interfaces 210, processors 220, memory 230, or databases 240. Furthermore, the components of initial detection point 50 may be integrated or separated. For example, network interface 210, processor 220, memory 230, and database 240 may be incorporated into a single component.

Figure 3:
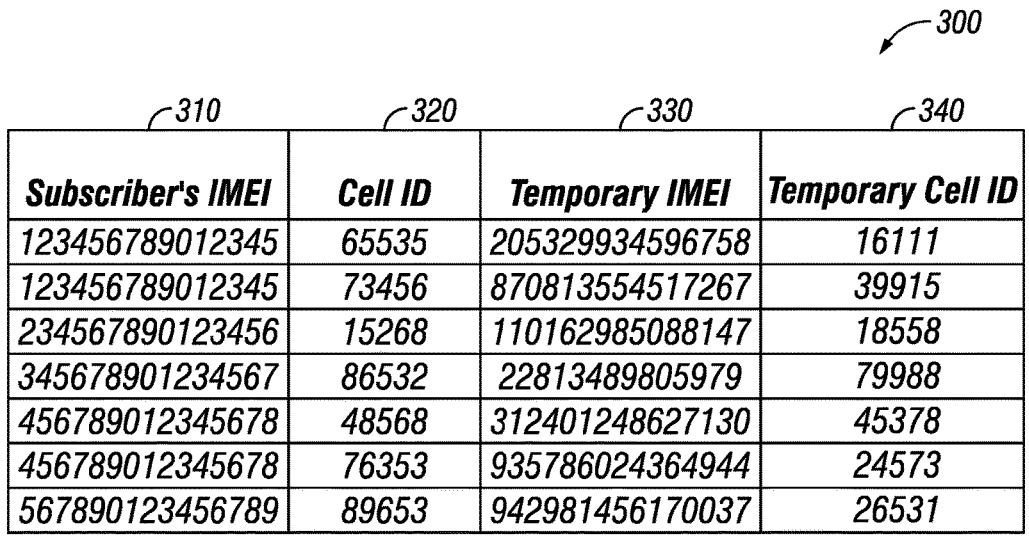
FIG. 3 illustrates an exemplary table associating a temporary networked device identifier and temporary location information with a networked device identifier and location information.

FIG. 3 illustrates an exemplary table 300 associating a temporary networked device identifier and temporary location information with a networked device identifier and location information. In the illustrated table, table 400 includes networked device identifier field 310, location information field 320, temporary networked device identifier field 330, and temporary location information field 340.

Networked device identifier field 310 contains information that identifies networked device 20. In this example, networked device 20's IMEI is used as networked device identifier field 310. As an additional example, networked device 20 may be identified by its MIN, MSIN, ICC-ED, IMSI, MSISDN, ESN, MEID, or any other type of identifier that identifies networked device 20 as originating the call.

Location information field 320 contains location-based data. For example, location information may comprise the location of base station 32 associated with the networked device identifier, coordinates of networked device identifier field, or any other type of information associated with networked device 20. In table 300, location information field contains a cell ID that is associated with the location of networked device 20.

Temporary networked device identifier field 330 includes a temporary mobile identifier that is associated with networked device identifier. In an embodiment, initial detection point 50 may create a temporary networked device identifier using random number generators, such as pseudorandom number generators, middle square method, Mersenne Twister algorithm, or any other method that masks the original networked device identifier. A requesting user is unlikely able to decrypt the networked device identifier from temporary networked device identifier. Because a requesting user does not receive the networked device identifier, the requesting user cannot use the networked device identifier for fraudulent purposes.

Temporary location information field 340 includes temporary location information that is associated with location information of networked device 20. Similar to temporary networked device, initial detection point 50 may create a temporary location information using random number generators, such as pseudorandom number generators, middle square method, Mersenne Twister algorithm, or any other method that masks the original location. Again, similar to the temporary networked device identifier, the requesting user is unlikely able to decrypt the location information from the temporary location information. Because a requesting user does not receive the location information of networked device 20, the requesting user cannot use the location information for fraudulent purposes.

Modifications, additions, or omissions may be made to table 300 without departing from the scope of the disclosure. Additionally, the fields in table 300 may be organized and/or arranged in any suitable manner.

Figure 4:
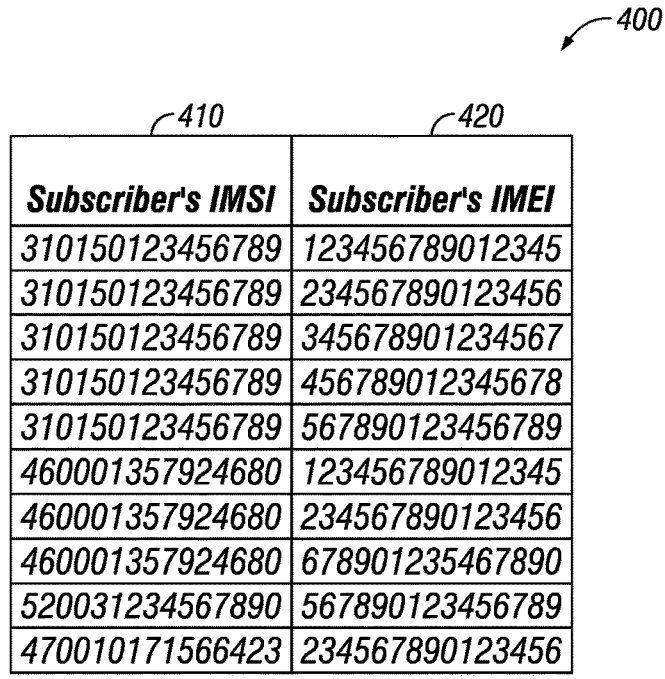
FIG. 4 illustrates an exemplary table associating a subscriber identifier with hardware identifiers according to particular embodiments.

FIG. 4 illustrates an exemplary table 400 associating a subscriber identifier with hardware identifiers. In the illustrated table, exemplary table 400 includes subscriber identifier field 410 and hardware identifier field 420.

Subscriber identifier field 410 includes a subscriber identifier for a user of networked device 20. The user of networked device 20 typically is correlated with the SIM card used in networked device 20. In this particular embodiment, subscriber identifier 510 is the IMSI. As additional examples, subscriber identifier 410 may be a MIN, MSIN, ICC-ED, or any other identifier that identifies the user of networked device 20.

Hardware identifier field 420 includes a hardware identifier for networked device 20. In this particular embodiment, hardware identifier 420 is the IMEI. As additional examples, a hardware identifier may comprise an ESN, MEID, or any other identifier that identifiers the hardware of networked device 20.

As an example, table 400 illustrates an example set of hardware identifiers that are associated with subscriber identifiers. An example software identifier in software identifier field 410 is the IMSI "310150123456789." IMSI "310150123456789" is associated with five different hardware identifiers 410. In an example, if the hardware identifier threshold is five, networked device 20 associated with IMSI "310150123456789" may be blocked from originating a communication if networked device 20 attempts to associate an additional hardware identifier to its subscriber identifier. In certain embodiments, initial detection point 50 may communicate an error to networked device 20 indicating that a maximum capacity of hardware identifiers associated with the subscriber identifier has been reached.

Modifications, additions, or omissions may be made to table 400 without departing from the scope of the disclosure. For example, table 400 may include any other suitable fields that associate a subscriber identifier of networked device 20 with one or more hardware identifiers of networked device 20. Additionally, the fields in exemplary table 500 may be organized and/or arranged in any suitable manner.

Figure 5:
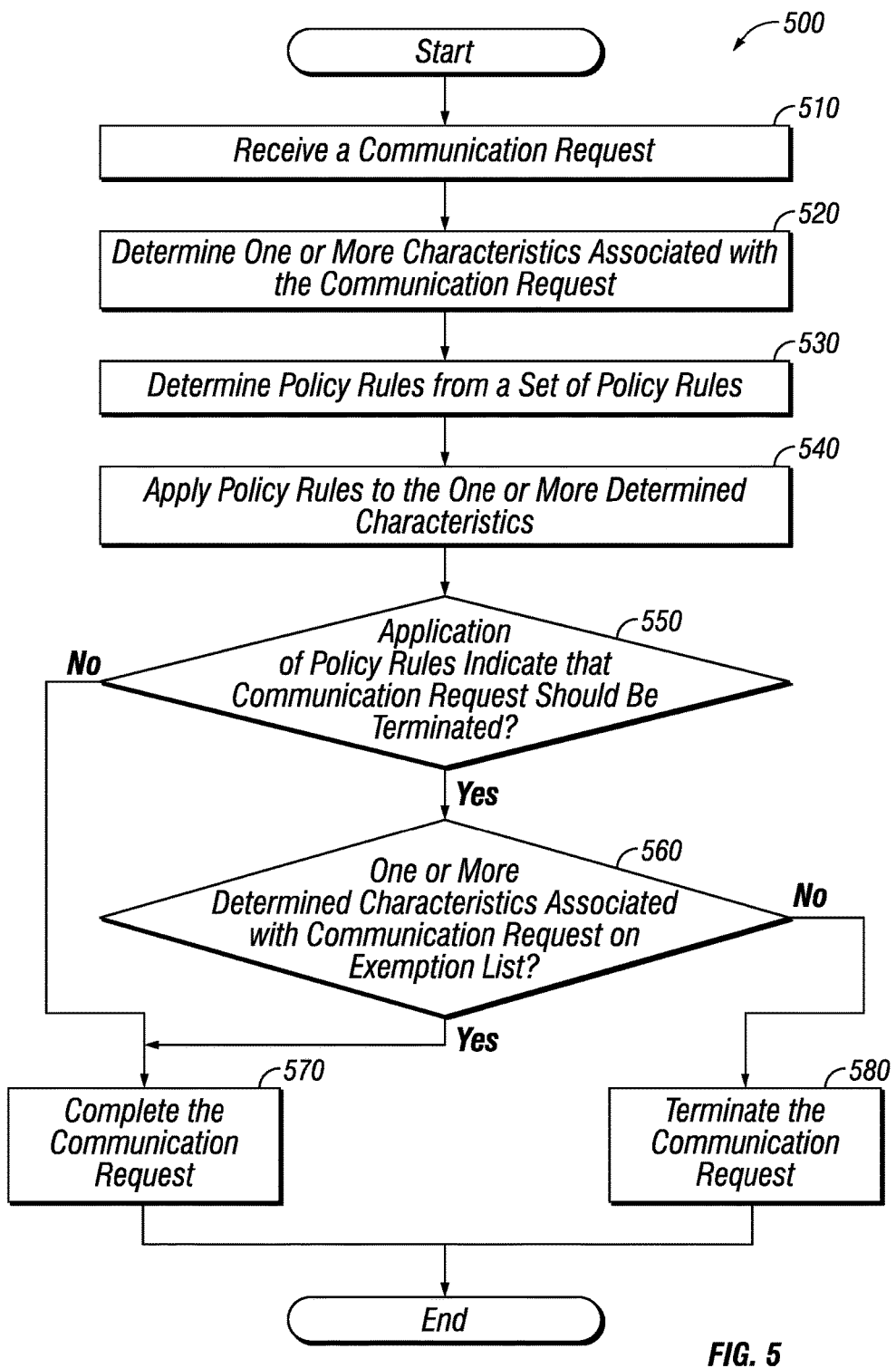
FIG. 5 illustrates example method for applying one or more policy rules to one or more characteristics associated with a communication request.

FIG. 5 illustrates example method 500 for applying one or more policy rules to one or more characteristics associated with a communication request. Using this technique, a communication request may be terminated based on the application of the policy rule to the characteristics. The application of one or more policy rules to one or more characteristics associated with a communication request and the actions decided from the application of the one or more policy rules may occur in real-time or near real-time to when a communication request is communicated from networked device 50.

At step 510, access network 30 may receive a communication request from networked device 20. A communication request may precede the communication itself, may be a header to the communication, may be the communication itself, or any other type of message to indicate that a request for communication has been made. In certain embodiments, access network 30 communicates a request to initial detection point 50 to authorize the communication. In alternate embodiments, initial detection point 50 automatically receives the information to determine whether to authorize the communication. For example, access network 30 may route the communication to initial detection point 50.

At step 520, initial detection point 50 determines one or more characteristics associated with the communication request. Certain characteristics, such as the subscriber identifier, hardware identifier, and destination of the communication, may be determined from the communication request. In addition, initial detection point 50 may look at past CDRs to determine previous data records associated with the subscriber identifier and/or hardware identifier to identify characteristics associated with the communication request.

At step 530, initial detection point 50 determines a subset of policy rules from the set of policy rules. Initial detection point 50 may determine one or more policy rules to apply from a set of policy rules based in part on the one or more characteristics associated with the communication request.

At step 540, initial detection point 50 applies policy rules to the one or more determined characteristics. The application of the policy rules to the one or more determined characteristics will indicate if the communication request should be terminated at step 550. If the application indicates that the communication request should not be terminated, the method proceeds to step 570 where initial detection point 50 completes the communication request. If the application indicates that the communication request should be terminated, the method proceeds to step 560.

At step 560, initial detection point 50 determines if one or more of the determined characteristics are included on an exemption list. The exemption list may contain a list of one or more determined characteristics (e.g., subscriber identifier, hardware identifier, destination call number, originating call time). If the one or more determined characteristics are on the exemption list, the method proceeds to step 570 where initial detection point 50 completes the communication request. However, if the exemption list does not contain at least one of the determined characteristics, the method proceeds to step 580 where initial detection point 50 terminates the communication request. Terminating the communication request may include not responding to the communication request, issuing a message to networked device 20 indicating that the communication request was rejected, or blocking the communication associated with the communication request.

Modifications, additions, or omissions may be made to the method depicted in FIG. 5. The method may include more, fewer, or other steps. While discussed as initial detection point 50 performing the steps, any suitable component of mobile communication system 10 may perform one or more steps of the method. Additionally, steps may be performed in parallel or in any suitable order.

Figure 6:
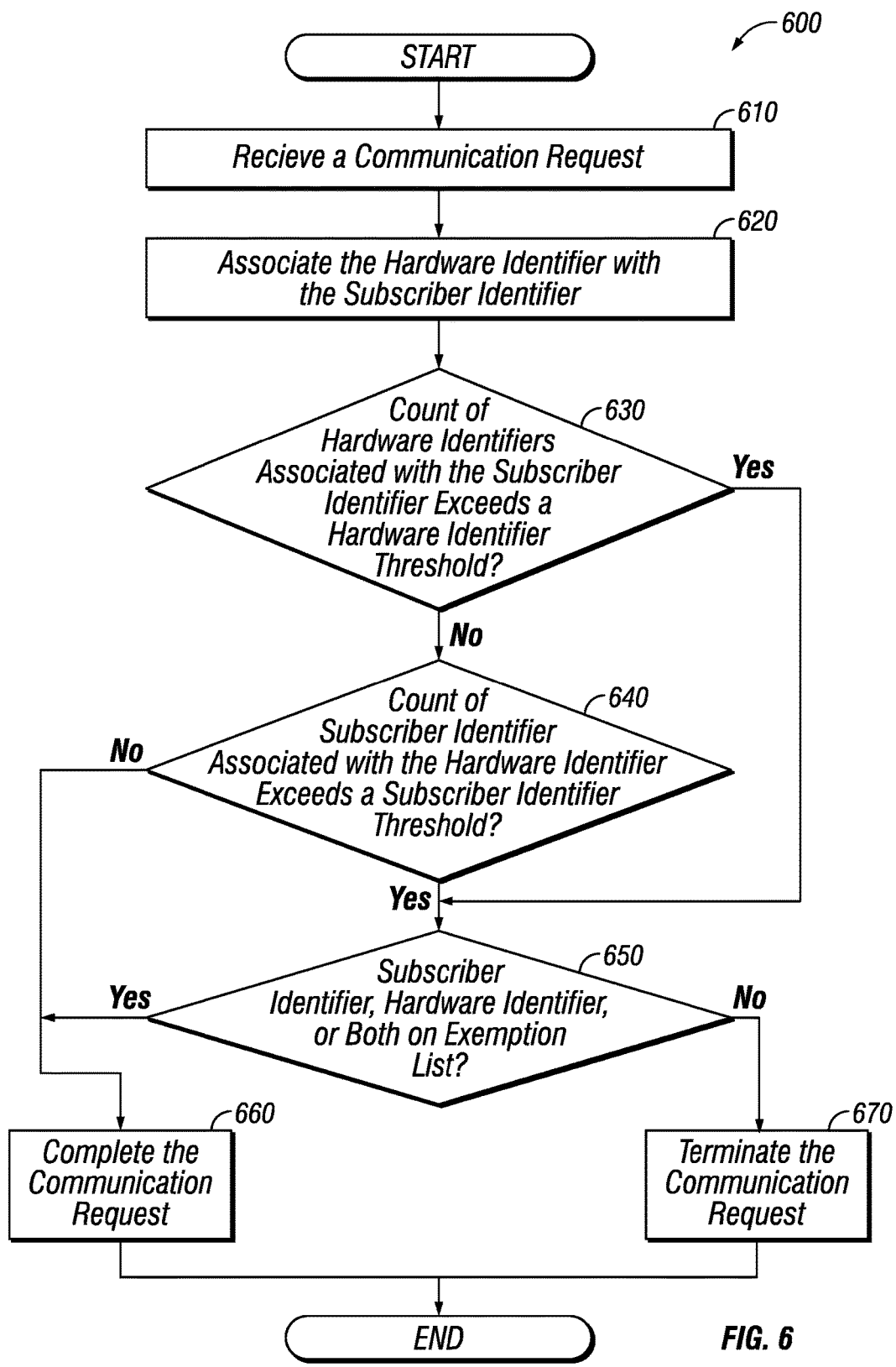
FIG. 6 illustrates an example method for determining a count of hardware identifiers associated with a subscriber identifier and a count of subscriber identifiers associated with a hardware identifier.

FIG. 6 illustrates example method 600 for determining a count of hardware identifiers associated with a subscriber identifier and a count of subscriber identifiers associated with a hardware identifier. Using this technique, a communication request may be terminated when the count of the hardware identifiers exceeds a hardware identifier threshold.

At step 610, access network 30 may receive a communication request from networked device 20. The communication request comprises information such that initial detection point 50 may determine a subscriber identifier and a hardware identifier associated with networked device 20. In certain embodiments, access network 30 communicates a request to initial detection point 50 to authorize the communication.

At step 620, initial detection point 50 may associate the hardware identifier of networked device 20 with the subscriber identifier associated with networked device 20. In certain embodiments, initial detection point 50 may query database 240 to determine whether the hardware identifier has previously been associated with the subscriber identifier. If the hardware identifier has not been previously associated with the subscriber identifier, initial detection point 50 may add the hardware identifier to a list of hardware identifiers associated with the subscriber identifier. Initial detection point 50 may also receive a list of hardware identifiers that are associated with the subscriber identifier, receive a count of hardware identifiers associated with the subscriber identifier, or any other method such that initial detection point 50 determines the number of hardware identifiers associated with the subscriber identifier.

At step 630, initial detection point 50 may determine if the count of hardware identifiers associated with the subscriber identifier exceeds a hardware identifier threshold. The hardware identifier threshold may be a set limit of hardware identifiers that may be associated with a subscriber identifier. In alternate embodiments, the hardware identifier threshold may be an adaptive limit of hardware identifiers that may be associated with a subscriber identifier. The threshold of hardware identifiers may adapt based on time passed since a new hardware identifier has associated with the subscriber identifier or other characteristics associated with the user (e.g., number of calls, data usage, time of day, etc.). The count of hardware identifiers associated with the hardware identifiers may also be ascertained from querying database 240. If the count of hardware identifiers associated with the subscriber identifier exceeds a hardware identifier threshold, the method proceeds to step 650. However, if the count of hardware identifiers associated with the subscriber identifier does not exceed a hardware identifier threshold, the method may proceed to step 640.

Similar to step 630, initial detection point 50 may determine if the count of subscriber identifiers associated with the hardware identifier exceeds a subscriber identifier threshold at step 640. The subscriber identifier threshold may be a set limit of subscriber identifiers that may be associated with a hardware identifier. In alternate embodiments, the subscriber identifier threshold may be an adaptive limit of subscriber identifiers that may be associated with a hardware identifier. The count of subscriber identifiers associated with the hardware identifiers may also be ascertained from querying database 240.

If the count of subscriber identifiers associated with the hardware identifier exceeds a subscriber identifier threshold, the method proceeds to step 650. However, if the count of hardware identifiers associated with the subscriber identifier does not exceed a hardware identifier threshold, the method may proceed to step 660 wherein initial detection point 50 completes the communication request for networked device 20.

At step 650, initial detection point 50 determines if the subscriber identifier, the hardware identifier, or both are on an exemption list. The exemption list contains a list of subscriber identifiers and hardware identifiers that are excluded from complying with the hardware identifier threshold. If the subscriber identifier, hardware identifier, or both are included on the exemption list, the method may proceed to step 660 wherein initial detection point 50 completes the communication request for networked device 20.

However, if both the subscriber identifier and hardware identifier are not on the exemption list, initial detection point 50 may terminate the communication request at step 670. Terminating the communication request may entail not responding to the communication request or issuing a message to networked device 20 indicating that the communication request was rejected because the number of hardware identifiers for the subscriber identifier exceeded a threshold.

Modifications, additions, or omissions may be made to the method depicted in FIG. 6. The method may include more, fewer, or other steps. While discussed as initial detection point 50 performing the steps, any suitable component of mobile communication system 10 may perform one or more steps of the method. Additionally, steps may be performed in parallel or in any suitable order.

Figure 7:
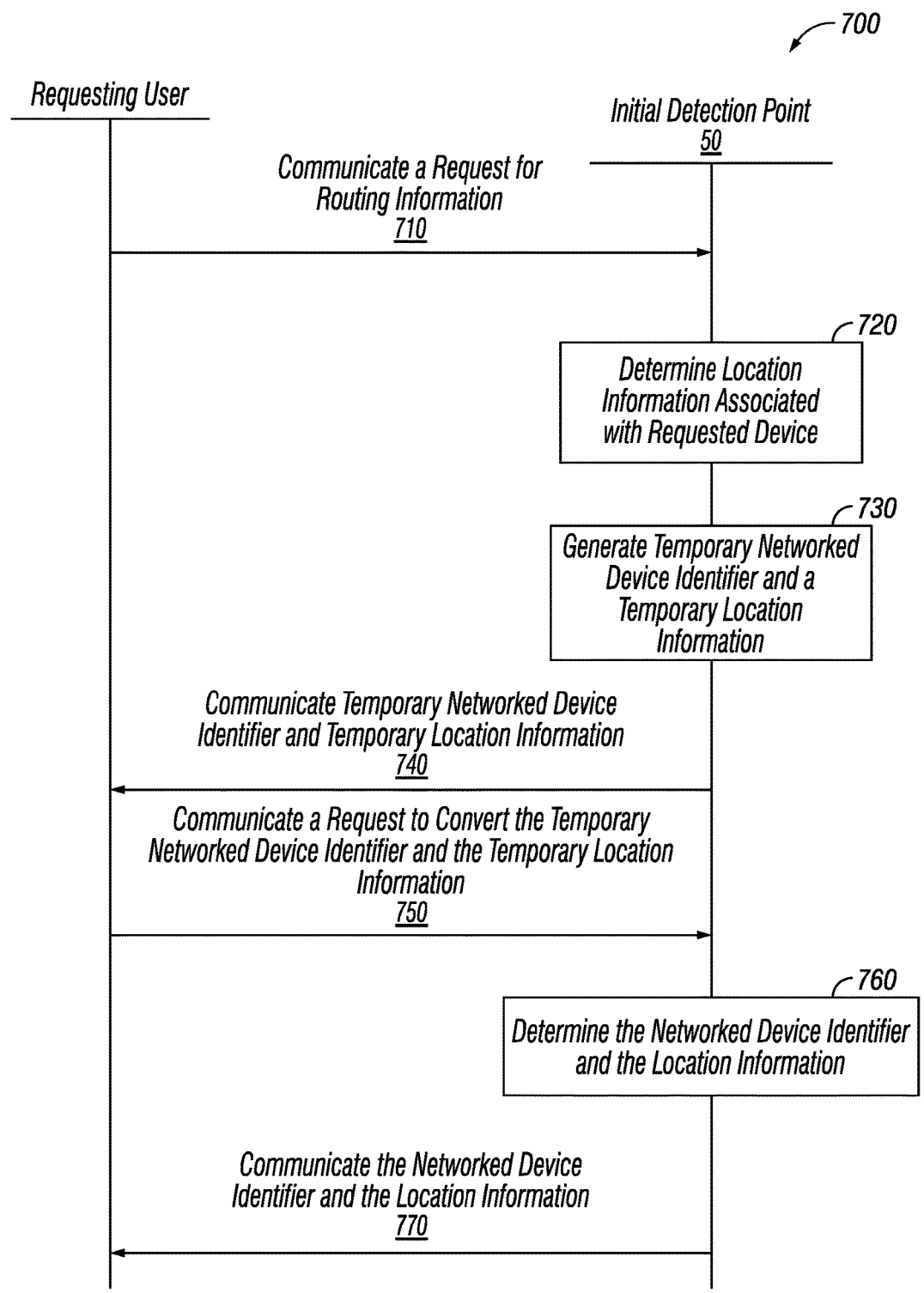
FIG. 7 illustrates an exemplary interaction diagram depicting the interaction that may occur between a requesting user and an initial detection point to create a temporary networked device identifier and temporary location information.

FIG. 7 illustrates exemplary interaction diagram 700 depicting the interaction that may occur between a requesting user and initial detection point 50 to create a temporary networked device identifier and temporary location information.

In step 710, the requesting user may communicate a request for routing information to initial detection point 50. Typically, initial detection point 50 receives a request for routing information from a requesting user that is an international user. Routing information for networked device 20 may comprise a location information for networked device 20 (e.g., base station 32 connected to networked device 20, GPS coordinates of networked device 20), networked device 20 identifier (e.g., IMEI, phone number, or any other unique identifier of networked device 20), and any other information associated with networked device 20 such that communications to networked device 20 may be redirected (e.g., through a redirect request) or a request for the location of networked device 20 may be made (e.g., though a location request).

At step 720, initial detection point 50 determines the routing information associated with the requested networked device 20. Initial detection point 50 may create a temporary location information and a temporary networked device identifier, and may associate the temporary location information and the temporary networked device identifier with the location information and networked device identifier of the requested networked device 20 at step 730. Initial detection point 50 may generate the temporary location information and temporary networked device identifier using random number generators. In certain embodiments, initial detection point 50 may store the association of the temporary location information and the temporary networked device identifier with the location information and networked device identifier in a database. In an embodiment, initial detection point 50 may create a temporary location information and a temporary networked device identifier only when the requesting user is an international user.

At step 740, initial detection point 50 may communicate the temporary location information and temporary networked device identifier to the requesting user. At step 750, the requesting user may communicate a request to convert the temporary networked device identifier and the temporary location information. In certain embodiments, the requesting user may be one or more components in access network 40 and/or core network 50. For example, access network 40 may receive a communication that contains routing instructions to the temporary location information and temporary networked device identifier. Access network 40, in this example, may communicate a request to convert the temporary networked device identifier and temporary location information to initial detection point 50 in order to receive the actual networked device identifier and location information.

In particular embodiments, initial detection point 50 may encrypt the communication of temporary networked device identifier and temporary location information before communicating to the requesting user. Initial detection point 50 may encrypt the communication using Diffie-Hellman key exchange, RSA algorithms, or protocols such as SSH, S/MIME, AES, SSL, or TSL. At the very least, initial detection point 50, requesting user, or both elements have the decryption key.

At step 760, initial detection point 50 determines the location information and networked device identifier associated with the temporary location information and temporary networked device identifier. In certain embodiments, initial detection point 50 determines the location information and networked device identifier by using the received temporary networked device identifier and temporary location information. At step 770, initial detection point 50 communicates the networked device identifier and the location information to the requesting user in certain embodiments.

Particular embodiments may repeat one or more steps in the interactions in FIG. 7, where appropriate. Although this disclosure describes and illustrates particular steps of the interactions of FIG. 7 as occurring in a particular order, this disclosure contemplates any suitable steps of the method of FIG. 7 occurring in any suitable order. For example, one or more steps may be performed in parallel. Moreover, the steps may include more, fewer, or other steps. Furthermore, although this disclosure describes and illustrates particular components, devices, or systems carrying out particular steps of the interactions of FIG. 7, this disclosure contemplates any suitable combination of any suitable components, devices, or systems carrying out any suitable steps of the method of FIG. 7.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An apparatus, comprising:
   a network interface operable to receive, from a requesting user, a request for routing information of a requested device;
   a processor communicatively coupled to the network interface and operable to:
   determine location information associated with the requested device; and generate a temporary networked device identifier associated with a networked device identifier of the requested device and temporary location information associated with the location information; and
the network interface further operable to communicate the temporary networked device identifier and temporary location information to the requesting user.

2. The apparatus of claim 1, wherein:
the network interface is further operable to receive a request to convert the temporary location information and the temporary networked device identifier;
the processor is further operable to determine the networked device identifier using the temporary networked device identifier and the location information using the temporary networked device identifier; and
the network interface is further operable to communicate the networked device identifier and the location information.

3. The apparatus of claim 2, wherein the networked device identifier of the requested device is an international mobile subscriber identifier (IMSI) associated with the requested device.

4. The apparatus of claim 1 wherein the processor is further operable to generate the temporary networked device identifier associated with the requested device and the temporary location information associated with the location information using a masking algorithm.

5. The apparatus of claim 1, wherein:
the network interface is further operable to receive a second request for routing information of the requested device; and
the processor is further operable to generate a second temporary networked device identifier associated with the networked device identifier of the requested device, wherein the second temporary networked device identifier is different than the temporary networked device identifier.

6. The apparatus of claim 1, wherein the processor is further operable to generate a temporary networked device identifier by executing a random number generator.

7. The apparatus of claim 1, wherein the processor is further operable to encrypt the communication of the temporary networked device identifier and temporary location information.

8. A method, comprising:
receiving, from a requesting user, a request for routing information of a requested device;
determining, by a processor, location information associated with the requested device;
generating, by the processor, a temporary networked device identifier associated with a networked device identifier of the requested device and temporary location information associated with the location information; and
communicating the temporary networked device identifier and temporary location information to the requesting user.

9. The method of claim 8, further comprising:
receiving a request to convert the temporary location information and temporary networked device identifier;
determining, by the processor, the networked device identifier using the temporary networked device identifier and the location information using the temporary networked device identifier; and
communicating the networked device identifier and the location information.

10. The method of claim 9, wherein the networked device identifier of the requested device is an international mobile subscriber identifier (IMSI) associated with the requested device.

11. The method of claim 8, further comprising generating, by the processor, the temporary networked device identifier associated with the requested device and the temporary location information associated with the location information using a masking algorithm.

12. The method of claim 8, further comprising:
receiving a second request for routing information of the requested device; and
generating, by the processor, a second temporary networked device identifier associated with the networked device identifier of the requested device, wherein the second temporary networked device identifier is different than the temporary networked device identifier.

13. The method of claim 8, further comprising generating, by the processor, a temporary networked device identifier by executing a random number generator.

14. The method of claim 8, wherein further comprising encrypting, by the processor, the communication of the temporary networked device identifier and temporary location information.

15. Non-transitory computer readable medium comprising logic, the logic, when executed by a processor, operable to:
receive, from a requesting user, a request for routing information of a requested device;
determine location information associated with the requested device;
generate a temporary networked device identifier associated with a networked device identifier of the requested device and temporary location information associated with the location information; and
communicate the temporary networked device identifier and temporary location information to the requesting user.

16. The computer readable medium of claim 15, wherein the logic is further operable to:
receive a request to convert the temporary location information and temporary networked device identifier;
determine the networked device identifier using the temporary networked device identifier and the location information using the temporary networked device identifier; and
communicate the networked device identifier and the location information.

17. The computer readable medium of claim 15, wherein the networked device identifier of the requested device is an international mobile subscriber identifier (IMSI) associated with the requested device.

18. The computer readable medium of claim 15, wherein the logic is further operable to generate the temporary networked device identifier associated with the requested device and the temporary location information associated with the location information using a masking algorithm.

19. The computer readable medium of claim 15, wherein the logic is further operable to:
receive a second request for routing information of the requested device; and
generate a second temporary networked device identifier associated with the networked device identifier of the requested device, wherein the second temporary networked device identifier is different than the temporary networked device identifier.

20. The computer readable medium of claim 15, wherein the logic is further operable to encrypt the communication of the temporary networked device identifier and temporary location information.

* * * * *